United States Patent Office

3,516,918
Patented June 23, 1970

3,516,918
ALKALI METAL CHLORATE CELL
Morris P. Grotheer, John E. Currey, and Edward H. Cook, Jr., Lewiston, N.Y., assignors to Hooker Chemical Corporation, Niagara Falls, N.Y., a corporation of New York
Filed Nov. 30, 1965, Ser. No. 510,617
Int. Cl. B01k 3/00; C01b 11/26
U.S. Cl. 204—266
5 Claims

ABSTRACT OF THE DISCLOSURE

A method for the production of alkali metal chlorate in an electrolytic cell having an anode and a cathode separated by a porous diaphragm into an anode and cathode compartment comprising imposing a decomposition voltage between said electrodes, introducing an acidified solution of alkali metal chloride into the anode compartment, feeding a separate alkali metal chloride solution into the cathode compartment, passing the chlorine formed at the anode and the alkali metal hydroxide formed at the cathode to a mixing zone and therein effecting the reaction of chlorine and alkali metal hydroxide to produce hypochlorite and subsequently alkali metal chlorate.

---

This invention relates to the production of alkali metal chlorates and to a novel electrolytic cell therefor. More particularly, the present invention relates to a method for producing alkali metal chlorates in a novel diaphragm type electrolytic cell which provides greatly improved anode current efficiencies and improved over-all cell efficiency.

Previously, alkali metal chlorates were produced commercially by electrolyzing brine solutions such as a sodium chloride solution between anode and cathode electrodes. Such cells operated at a maximum current efficiency of about 90 percent. Current efficiencies increased with increasing current densities within the range of about 0.6 to 1.0 ampere per square inch, but decreased with increasing current densities above about 1.0 to 1.2 amperes per square inch. Thus, it was preferable to operate at the lower current densities using an electrolyte having a pH of about 6.5 to 7.5. Under such conditions, chloride ions oxidized at the anode to produce atomic chlorine which reacted immediately with water or caustic to form hypochlorite ions. The hypochlorite ions were formed on or extremely close to the surface of the anode. Being anions, they were attracted to the anode and many of them reacted to produce chlorate electrochemically.

The most desirable process to obtain the highest current efficiencies involves electrochemical production of hypochlorite and chemical production of chlorate from the hypochlorite. Thus, both electrochemical and chemical reactions are involved in producing chlorate. If all of the chlorate is produced from hypochlorite electrochemically, the maximum current efficiency of the cell would be about 67 percent. When the current efficiency of a chlorate cell is 90 percent, about 30 percent of the chlorate is being produced electrochemically and about 70 percent chemically. Because at least a portion of the chlorate was formed from hypochlorite electrochemically, rather than chemically, previous processes were inherently limited to a low maximum current efficiency.

Thus, it is desirable to provide a chlorate cell which is suitable for operation at higher current densities and in which the electrochemical production of chlorate from hypochlorite can be substantially reduced or eliminated.

It is an object of the present invention to provide an electrolytic cell for the production of chlorate having greatly improved current efficiencies. Another object of the present invention is to provide a chlorate cell particularly suited for operation at higher current densities. It is a further object of this invention to provide a continuous process for the production of chlorates by means of an improved electrolytic chlorate cell. These and other objects will become apparent to those skilled in the art from the description of the invention which follows.

In accordance with the invention, there is provided an electrolytic cell for the production of an alkali metal chlorate comprising a container for liquid having an anode and a cathode separated by means of a porous diaphragm to form an anolyte compartment and a catholyte compartment, means for feeding electrolyte to said anolyte compartment, and separate means for feeding electrolyte to said catholyte compartment with said anolyte and catholyte compartments being in communication with a mixing chamber for effluent gases and liquors from said anolyte and catholyte compartments. The present invention further provides a method for the production of an alkali metal chlorate in an electrolytic cell having an anode and a cathode separated by a porous diaphragm to form an anolyte and a catholyte compartment comprising imposing a decomposition voltage between said electrodes, feeding an acidified solution of alkali metal chloride to the anolyte compartment, feeding a separate alkali metal chloride containing solution to the catholyte compartment, producing chlorine at said anode and alkali metal hydroxide at said cathode, passing said chlorine and said alkali metal hydroxide to a mixing zone and mixing and reacting said chlorine and alkali metal hydroxide thereby producing hypochlorite and subsequently an alkali metal chlorate.

The present invention provides a much more efficient process for producing chlorates by providing a means for eliminating electrochemical production of chlorate from hypochlorite, thus eliminating needless expenditures of current. In a further embodiment of the invention, a recycle process is provided whereby the chlorates produced by the cell are continuously or periodically removed by crystallization and wherein the mother liquor is returned to the cell with replenishing amounts of alkali metal chloride for further electrolysis. A particularly desirable feature of the present invention is that conventional chlorate cells can be modified in accordance with the present invention to provide more efficient chlorate production.

The invention will be further described with reference to the drawings in which.

Figure 1:
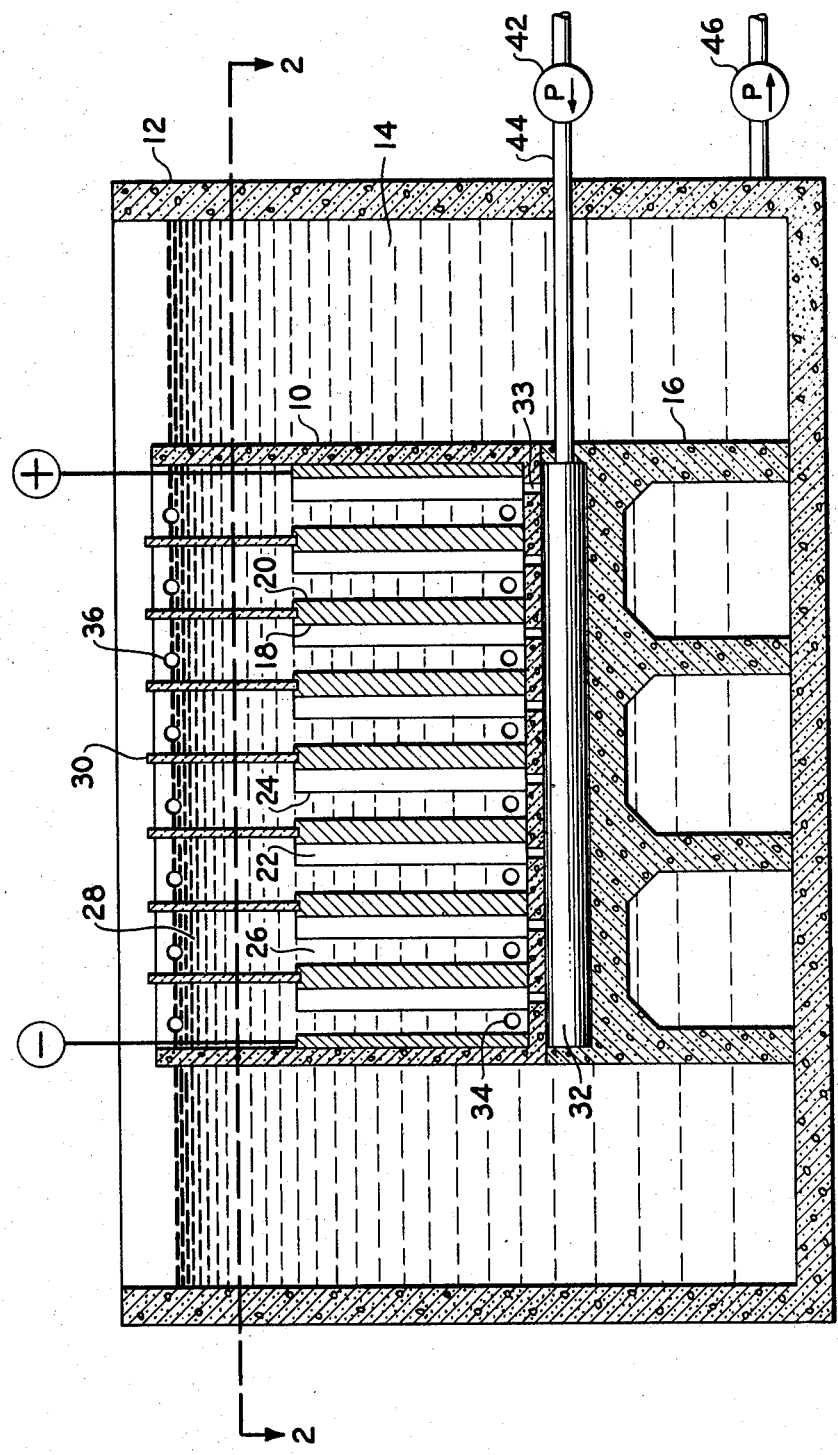
FIG. 1 is a vertical sectional view illustrating a cell of the present invention submerged in an electrolyte reservoir.

The present invention comprises an electrolytic cell 10 which is conveniently enclosed in an electrolyte reservoir 12 which is normally filled with electrolyte 14 during the operation of the cell. Thus, the electrolytic cell 10 can be submerged in electrolyte 14 to a desired level as provided for by support 16.

The electrolytic cell 10 comprises an anode 18, or series of anodes, a cathode 20, or series of cathodes, an anolyte compartment 22, a porous diaphragm 24 and a catholyte compartment 26. Above the anolyte compartment 22 and catholyte compartment 26 is a mixing chamber 28. The illustrated cell is a bipolar type cell and, therefore, separators 30 are preferably provided to reduce leakage of electric current around the electrodes. Anolyte compartment feed means are provided by means of a manifold 32 and feed line 33. The catholye compartment electrolyte feed means 34 open to electrolyte reservoir 12 and provide means for intake of electrolyte into the catholyte chamber. Mixing chamber 28 is provided with exhaust port 36 for the passage of liquid effluent out of the mixing chamber into electrolytic reservoir 12.

The anolyte compartment is preferably provided with a lid 38, having an opening 40 for the controlled passage of fluids from the anolyte compartment 22 into mixing chamber 38. In the operation of the cell 10 electrolyte is fed by means of pump 42 and line 44 to manifold 32 which feeds anolyte compartment 22 by means of feed line 33. As a decomposition voltage is passed through the cell, the reaction at the cathode in producing gaseous hydrogen causes pumping action of electrolyte 14 from electrolyte reservoir 12 through catholyte compartment feed means 34 into catholyte compartment 26 and subsequently to mixing chamber 28. The feed to the anolyte compartment is at a controlled variable rate determined by pump 42 and the capacity of manifold 32 and feed line 33. Anolyte liquor flowing through the anolyte compartment is electrolyzed therein to form chlorine, which escapes therefrom as a gas. The chlorine produced at the anode is passed through opening 40 into mixing chamber 28 wherein it is reacted with the hydroxyl ions produced in the catholyte compartment.

Mixing chamber 28 is preferably of sufficient depth so that sufficient residual time is given to the chlorine gas in passing through the chamber to be entirely absorbed. The preferred depth varies with the temperature, which affects the reaction rate, the pH in the mixing chamber and the rate at which chlorine is being produced. Higher current densities produce chlorine and caustic at a faster rate and therefore, the current density used is also a factor to consider. The depth of the mixing chamber can therefore vary considerably with the particular design and mixing action provided. The best depth can readily be ascertained by those skilled in the art. As a general indication, the mixing chamber preferably has a depth of about ½ to 2 times the height of the electrodes. In mixing and reacting chlorine and hydroxyl ions in mixing chamber 28, hypochlorite is formed which rapidly converts to chlorate under the preferred reaction temperatures and conditions.

The reactants are passed from mixing chamber 28 by means of exhaust ports 36 into electrolyte reservoir 12. Electrolyte reservoir 12 is of sufficient capacity to provide a limited residence time prior to the electrolyte being recirculated to the catholyte chamber. As such, it is preferably of a larger liquid capacity than the cell 10. In electrolyte reservoir 12, residual hypochlorite is provided with an aging time under conditions which favor chemical conversion to chlorate. Thus, in providing an aging period, electrolyte 14 normally contains less than about one percent hypochlorite as it is recirculated to the catholyte compartment 26 of cell 10 for further reaction.

Figure 4:
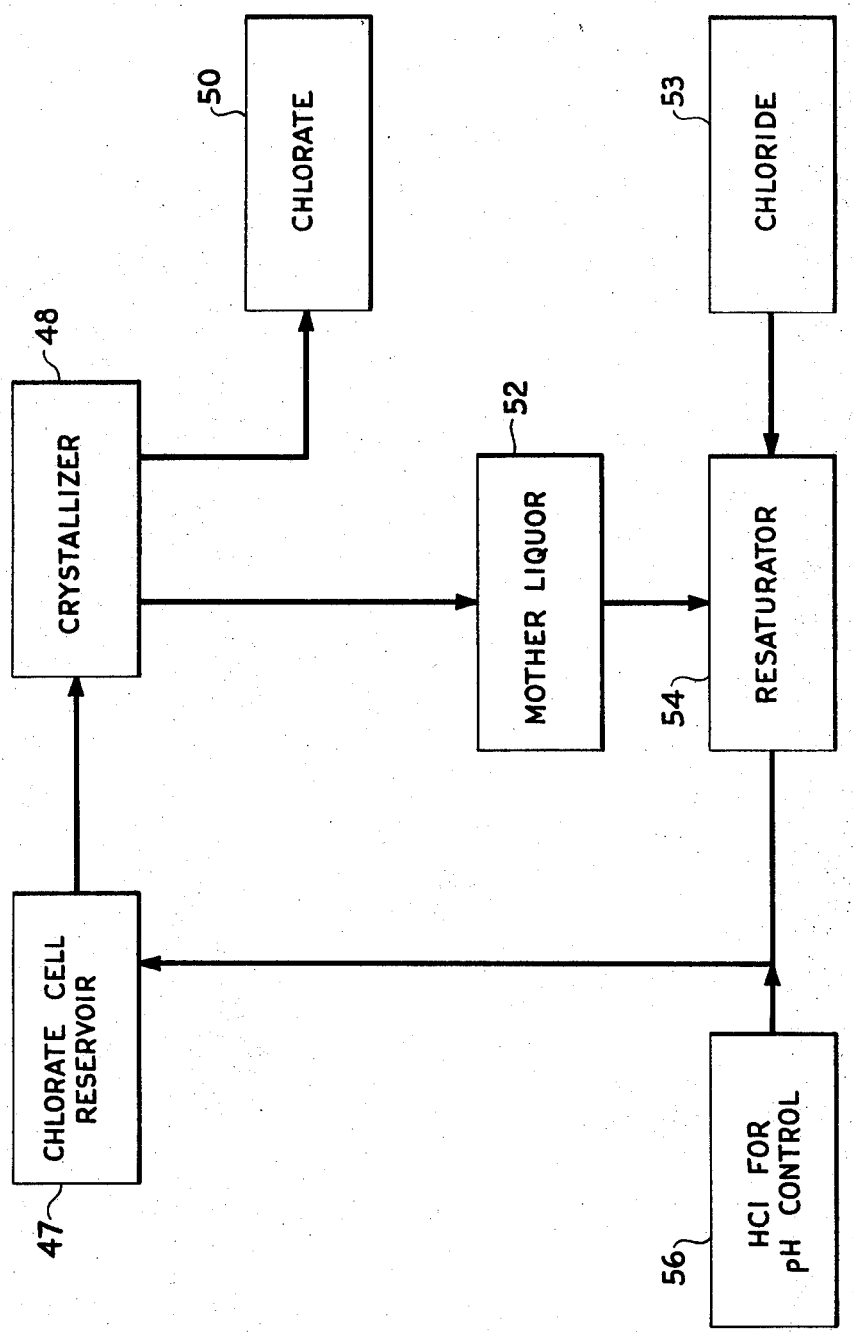
FIG. 4 is a flow sheet illustrating a continuous process for the production of alkali metal chlorates by the present invention.

As is further illustrated in the flow sheet in FIG. 4, the concentration of chlorate increases in the electrolyte 14 in electrolytic reservoir 12. This electrolyte is withdrawn by means of pump 46 from chlorate cell reservoir 47 and passes to crystallizer 48. Chlorate is separated in crystallizer 48 by conventional crystallization techniques, coupled with filtration, centrifuging or other liquid-solid separation techniques to produce solid chlorate 50 and mother liquor 52. The mother liquor 52 contains alkali metal chloride and residual amounts of chlorate which can vary in amount from about 10 to about 750 or more grams per liter for $NaClO_3$, depending on the crystallization conditions used. This liquor can be returned to electrolyte reservoir 12 or preferably resaturated with replenishing amounts of alkali metal chloride 53 in saturator 54 prior to returning to the anolyte compartment of the electrolytic cell. In the feed line to the anolyte compartment of the electrolytic cell, the pH of the feed solution is preferably controlled by the addition of HCl 56 or chlorine to provide an acidic feed brine for the anolyte compartment so that the pH in the anolyte compartment will be in the range of about one to four.

The process of the present invention is suitable for producing alkali metal chlorates such as sodium chlorate, potassium chlorate, lithium chlorate, rubidium chlorate, cesium chlorate, and the like. However, because of the ready availability and the favorable solubilities, sodium chlorate is the normally produced chlorate from which numerous other chlorates are formed. Since sodium chlorate is the most commonly produced chlorate the invention will be further described with particular reference to sodium chlorate. However, in describing sodium chlorate, it is to be noted that other chlorates are produced in the same manner by the present invention.

Although the drawing illustrates a bipolar electrolytic cell having graphite electrodes, the present invention is equally applicable in the same manner to other cells using monopolar electrodes. The type of electrodes can also be varied substantially. Various meats, as well as carbon electrodes can be used wherein the cathode can be any metal including steel, copper, nickel, stainless steel, platinum, and the like materials commonly used as cathodes and wherein the anode is a more resistant material such as platinum, platinum coated titanium or tantalum, lead dioxide, magnetite, or graphite.

The diaphragm used is of any suitable organic or inoragnic material which is resistant to the environment within the cell and which can be fabricated into a porous barrier. Materials such as asbestos, Teflon, after chlorinated polyvinyl chloride, polyvinylidene chloride, and the like, are particularly suitable. The diaphragm can be made by weaving the desired material into a cloth which can be inserted between the electrodes using a frame or other means of support.

In the present invention, separate feeds are provided for the anolyte compartment and the catholyte compartment. The anolyte feed material is a saturated or nearly saturated solution of sodium chloride acidified with HCl or chlorine which may also contain up to about 750 grams per liter of sodium chlorate. Preferably, the anolyte liquor contains at least 100 grams per liter of NaCl which may be the saturating amount at the operating temperature and concentration of $NaClO_3$. More preferably, the NaCl concentration is 130 to 300 grams per liter and the $NaClO_3$ concentration is zero to 600 grams per liter. Preferably, the pH is controlled so that the electrolyte in the anolyte compartment has a pH in the range of about one to four and more preferably a pH of about three. The anolyte feed rate is controlled so as to be equal to, or more preferably, less than the catholyte feed rate. Thus, the anolyte feed rate is equal to about 5 to 100 percent that of the catholyte.

The catholyte feed is the same electrolyte as is contained in the electrolyte reservoir surrounding the cell. Alternatively, this electrolyte feed can come from a storage vessel apart from the cell since the reservoir need not surround the cell but as such, it is most convenient. The catholyte feed normally comprises about 50 up to about 750 grams per liter sodium chlorate and a nearly saturating amount of NaCl at the $NaClO_3$ concentration. The NaCl content is preferably at least about 100 grams per liter and more preferably more than about 130 grams per liter. The sodium hypochlorite concentration is preferably less than about five grams per liter. The pH of this feed liquor is that of the reservoir, which is preferably about seven. The most preferred catholyte feed material is an aqueous solution containing about 100 to 500 grams per liter of sodium chlorate, about 100 to 250 grams per liter sodium chloride, depending on the $NaClO_3$ concentration, and as low a hypochlorite content as it readily attainable, i.e., less than about 0.5 gram per liter. The electrolyte feed rate to the catholyte compartment is normally a natural feed rate generated by the electrolysis taking place in the cell. The rapid evolution of hydrogen gas at the cathode causes a rapid intake of electrolyte into the catholyte compartment. Alternately, pumping means can be provided to increase the natural flow rate. However, the natural flow rate is normally adequate.

The cell operating temperature is preferably in the range of about 40 to 100 degrees centigrade and more preferably about 60 to 90 degrees centigrade. The preferred higher temperatures are preferably used with increasing concentrations of chlorate in the feed solutions. Increased temperatures reduce the electrolyte resistance while further promoting the conversion of hypochlorite to chlorate in the mixing chamber.

The mixing chamber is normally located immediately above the cell, but alternatively it may be apart from the cell. The pH in the mixing is preferably controlled at about neutral, or more specifically, at about 6 to about 8. The most preferred reaction conditions are at a pH of 6.5 to 7.5. The pH in the mixing chamber is controlled by one or more of several methods. One method is by means of the flow rate of anolyte liquor to the anolyte compartment and the pH thereof. Another method is by controlling the amount of hydrochloric acid or chlorine added to the anolyte feed electrolyte. By varying the additions of HCl or chlorine to the anolyte, the amount of chlorine produced for reaction with the caustic is changed, thus affecting the pH in the mixing chamber. In slowing the flow of anolyte liquor, less amounts of the acidic liquor pass into the mixing chamber, causing a rise in pH with the lesser flow rates and a lowering of the pH with increased flow rates. Also, secondary sources of acid and/or caustic can be used for pH adjustments.

The reaction of hydroxyl ions with chlorine is an exothermic reaction. This favors the conversion of hypochlorite to chlorate. Therefore, the temperature in the mixing chamber is about the same to slightly higher than in the cell. At the preferred temperatures and pH's the hypochlorite rapidly converts to chlorate. Some additional period of time, ranging from about five minutes to two hours is preferably provided to reduce the hypochlorite concentration as previously described. The aging is preferably effected in a container or reservoir either surrounding the cell itself or apart from the cell.

The following examples illustrate certain preferred embodiments of the present invention. Unless otherwise indicated, all parts and percentages used herein and in the claims are by weight and all temperatures are in degrees centigrade.

EXAMPLES 1–6

Figure 2:
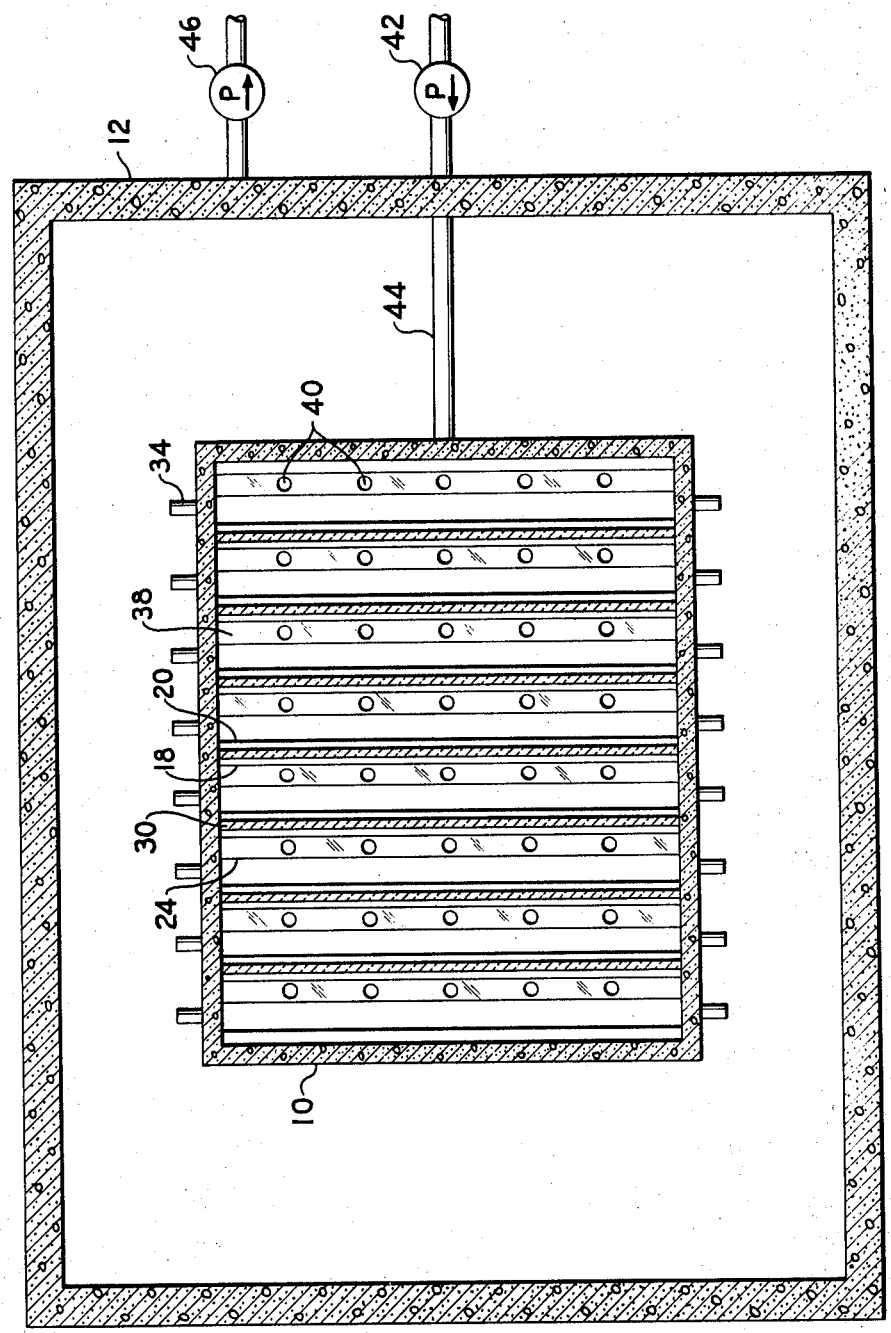
FIG. 2 is a horizontal sectional view of FIG. 1 along 2—2 further illustrating the cell of the present invention.
Figure 3:
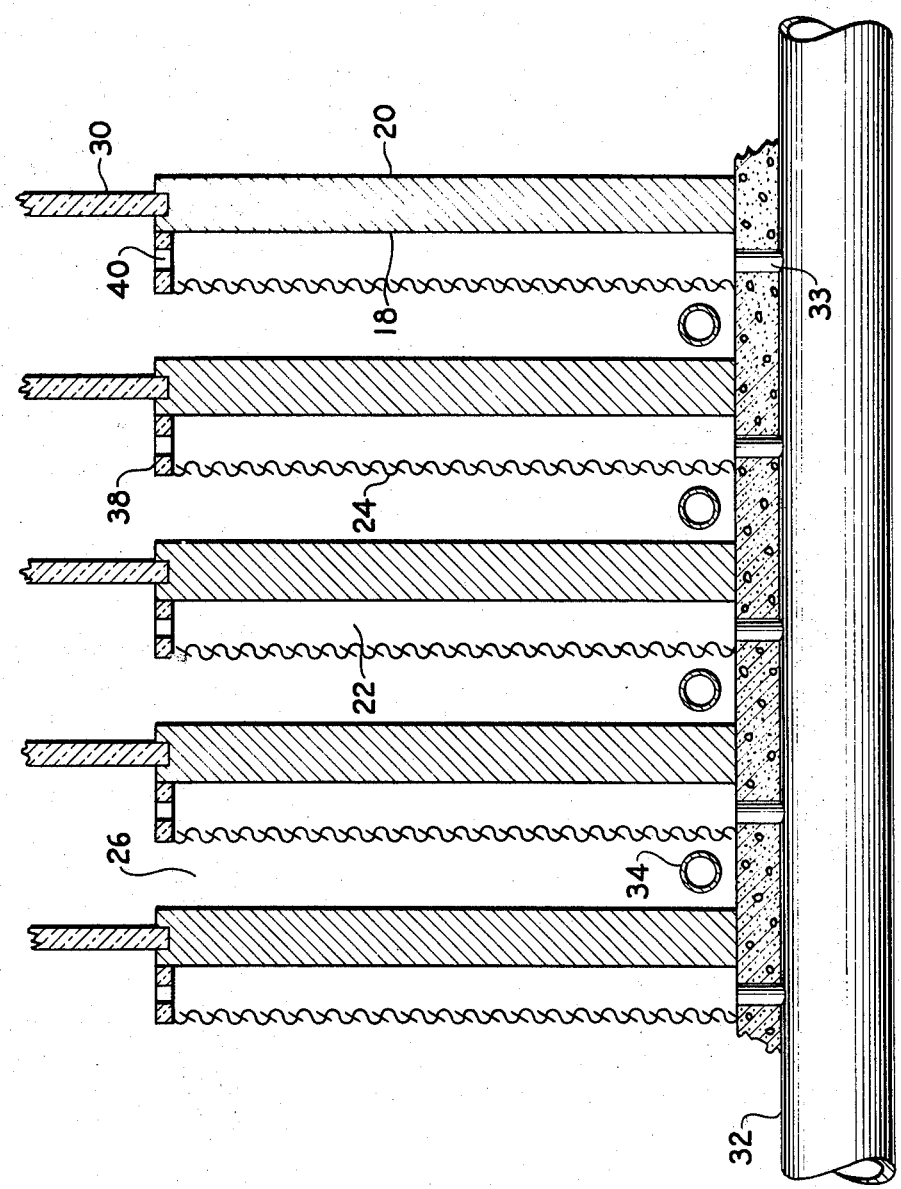
FIG. 3 is an enlarged vertical sectional view of a part of the cell of FIG. 1, further showing the anolyte and catholyte compartment detail thereof.

An electrolytic cell is constructed in accordance with FIGS. 1, 2 and 3 of the drawings using graphite anodes and cathodes separated by a woven asbestos diaphragm. The electrodes are about 36 inches in length and about one inch thick. About 75 of these electrodes are positioned a distance of 0.375 inch from each other in a concrete container to form a cell. Sheets of glass insulate the electrodes from the container while forming watertight chambers between each pair of electrodes. The glass sheets extended upward above the electrodes to form separators in the mixing chambers above the electrodes. The diaphragm separates the electrodes and forms separate anolyte compartments and catholyte compartments to which separate electrolyte solutions are fed at, or near the bottom of each compartment.

The anolyte feed solution used in operating the present cell in accordance with the invention was either an acidified sodium chloride solution or an acidified sodium chloride solution containing varying amounts of sodium chlorate as indicated in the various examples. The anolyte feed containing sodium chlorate was representative of a continuous process as shown in FIG. 4 wherein mother liquor is returned to the anolyte compartment of the cell with a replenishing amount of sodium chloride.

A mixing chamber provided above the cell had an aqueous depth of about equal to the depth of the electrodes beneath it. Chlorine produced at the anode and caustic produced at the cathode passed into the mixing chamber by means of both natural flow due to the gas evolution in the cell and the controlled feed to the anolyte compartment. The pH in the mixing chamber was controlled near or at about neutral as indicated for each example. The electrolyte from the mixing chamber was passed to a reservoir having a liquid capacity of about ten times that of the cell. The solution in the reservoir was used as the catholyte feed liquor.

To remove sodium chlorate from the reservoir liquor, a stream of liquor is continuously withdrawn from the reservoir, passed through a crystallizer wherein it is chilled to reduce the solubility of sodium chlorate thereby precipitating a crop of sodium chlorate crystals. The chlorate crystals are removed by filtration and the mother liquor is subsequently returned to the anolyte compartment of the cell as a replenished, acidified sodium chloride-chlorate solution.

In the cell, the anolyte compartment was enclosed with the exception of the electrolyte feed means and a series of small orifices in the top of the anolyte compartment, as illustrated in the drawings, to provide for the upward flow of anolyte liquor and the passage of the chlorine gas. The series of orifices substantially prevented the downward flow of neutral electrolyte from the mixing chamber to the anode compartment. The amount of HCl added to the anolyte feed reduced the pH to less than one, but provided a pH in the anolyte compartment of about 3. The migration of hydroxy ions from the catholyte compartment caused this increase in pH.

In the operation of the cell, the anolyte feed rate was 15 parts per minute and the catholyte feed rate was 100 parts per minute. An electrolytic current was induced across the cell through the bipolar electrodes by connecting the terminal electrodes to a positive and negative source of direct current. The cell temperature, the mixing chamber temperature and the reservoir temperature were maintained at about 60 degrees centigrade. Table I tabulates the results obtained with various current densities, anolyte feed concentrations and catholyte feed concentration. The current efficiencies were calculated based on cell gas analyses obtained by both Orsat and gas chromatographic methods.

TABLE I

| | Current density (amperes per square inch) | Anolyte feed in grams per liter—HCl is percent by weight | | | Catholyte feed from reservoir in grams per liter | | | | Electrolyte out of mixing chamber in grams per liter | | Current efficiency based on Orsat analysis, percent | Current efficiency based on gas chromatography analysis, percent |
|---|---|---|---|---|---|---|---|---|---|---|---|---|
| | | NaCl | NaClO$_3$ | HCl | pH | NaCl | NaClO$_3$ | Na$_2$Cr$_2$O$_7$ | NaClO | NaClO | pH | | |
| Example Number: | | | | | | | | | | | | | |
| 1 | 2.4 | 220 | 0 | 0.1 | 6.7 | 135 | 530 | 0.5 | 1.7 | 5.0 | 7.3 | 96.4 | 97.4 |
| 2 | 1.2 | 220 | 0 | 0.1 | 7.0 | 153 | 440 | 0.5 | 1.6 | 2.7 | 7.2 | 96.1 | 97.7 |
| 3 | 2.4 | 222 | 96 | 0.1 | 6.7 | 179 | 408 | 0.5 | 1.7 | 4.8 | 7.4 | 95.1 | (¹) |
| 4 | 2.4 | 222 | 191 | 0.1 | 6.7 | 179 | 408 | 0.5 | 2.1 | 4.2 | 7.1 | 95.1 | 97.4 |
| 5 | 2.4 | 211 | 282 | 0.1 | 6.9 | 179 | 408 | 0.5 | 1.7 | 4.5 | 7.2 | 94.0 | (¹) |
| Control for Examples 3–5 | | | | | | | | | | | | | |
| 6 | 2.4 | 225 | 0 | 0.1 | 6.8 | 198 | 390 | 0.5 | 2.5 | 4.4 | 7.1 | 95.0 | 96.6 |

¹ Not determined.

The above examples clearly illustrate that the present invention provides for the production of chlorates at extremely high efficiencies. The efficiencies obtained are up to 10 percent higher than those obtained in conventionally used cells.

The process is also operated at higher temperatures with correspondingly good results. With increased concentration of chlorate in the catholyte feed liquor, cell operating temperatures of about 80 degrees centigrade provide correspondingly good current efficiencies.

While there have been described various embodiments of the present invention, the apparatus and methods described are not intended to be understood as limiting the scope of the invention, as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. An apparatus for the production of an alkali metal chlorate comprising an electrolytic cell disposed within an electrolyte reservoir, said electrolytic cell having an anode and a cathode separated by a porous diaphragm to form an anolyte compartment and a catholyte compartment, means for feeding electrolyte to said anode compartment and separate means for feeding electrolyte to said catholyte compartment, said anolyte and catholyte compartments being in direct communication with a mixing chamber, said anolyte compartment being provided with a lid containing an orifice for controlled passage of fluids from the anolyte compartment into said mixing chamber, said mixing chamber, communicating with said electrolyte reservoir and providing a depth for fluids between about 0.5 to about 2 times the height of the anode and cathode of said electrolytic cell, and said electrolyte reservoir providing a liquid holding capacity larger than that of said electrolytic cell.

2. The apparatus of claim 1 wherein the gaseous and liquid outlets from said anolyte compartment are of restricted area.

3. The apparatus of claim 1 wherein the mixing chamber is positioned above the electrolytic cell.

4. The apparatus of claim 1 wherein the electrolytic cell is a bipolar electrolytic cell.

5. The apparatus of claim 1 wherein the electrolytic cell is a monopolar electrolytic cell.

References Cited
UNITED STATES PATENTS

| | | | |
|---|---|---|---|
| 685,274 | 10/1901 | Hass | 204—268 |
| 718,249 | 1/1903 | Hass | 204—268 |
| 3,055,821 | 9/1962 | Holmes et al. | 204—270 |
| 2,846,384 | 8/1958 | De Nora | 204—266 |
| 2,882,210 | 4/1959 | Jenks | 204—128 XR |

JOHN H. MACK, Primary Examiner

D. R. JORDAN, Assistant Examiner

U.S. Cl. X.R.

204—95, 263